United States Patent
Goto et al.

(10) Patent No.: US 7,627,414 B2
(45) Date of Patent: Dec. 1, 2009

(54) ROAD MAP MANAGEMENT SYSTEM

(75) Inventors: Masayuki Goto, Kariya (JP); Shinichi Yamada, Tokyo (JP)

(73) Assignee: DENSO CORPORATION, Kariya (JP)

(*) Notice: Subject to any disclaimer, the term of this patent is extended or adjusted under 35 U.S.C. 154(b) by 78 days.

(21) Appl. No.: 11/493,903

(22) Filed: Jul. 27, 2006

(65) Prior Publication Data
US 2007/0032946 A1 Feb. 8, 2007

(30) Foreign Application Priority Data
Aug. 3, 2005 (JP) ............................ 2005-225427

(51) Int. Cl.
B60T 8/23 (2006.01)
G01C 21/32 (2006.01)
G01S 13/00 (2006.01)

(52) U.S. Cl. ................... 701/93; 701/208; 701/211; 342/64

(58) Field of Classification Search ............ None
See application file for complete search history.

(56) References Cited

U.S. PATENT DOCUMENTS

| | | | | |
|---|---|---|---|---|
| 5,146,228 | A * | 9/1992 | Irani et al. | 342/64 |
| 5,828,336 | A * | 10/1998 | Yunck et al. | 342/357.02 |
| 6,107,961 | A * | 8/2000 | Takagi | 342/357.13 |
| 6,230,098 | B1 * | 5/2001 | Ando et al. | 701/208 |
| 6,453,233 | B1 * | 9/2002 | Kato | 701/208 |
| 6,904,362 | B2 * | 6/2005 | Nakashima et al. | 701/211 |
| 6,198,350 | B1 | 1/2006 | Lee et al. | |
| 7,024,307 | B2 | 4/2006 | Ito et al. | |
| 2002/0082773 | A1 * | 6/2002 | Ikeuchi et al. | 701/211 |
| 2002/0091485 | A1 * | 7/2002 | Mikuriya et al. | 701/208 |
| 2004/0135705 | A1 * | 7/2004 | Umezu et al. | 340/995.14 |

FOREIGN PATENT DOCUMENTS

| | | |
|---|---|---|
| CN | 1300032 A | 6/2001 |
| DE | 10030932 A1 | 1/2002 |
| EP | 0 921 509 A3 | 7/2000 |
| EP | 1 172 632 A1 | 1/2002 |
| JP | A-H11-167343 | 6/1999 |
| JP | A-2002-054934 | 2/2002 |
| JP | A-2004-286641 | 10/2004 |
| WO | WO 99/15857 | 4/1999 |

OTHER PUBLICATIONS

Office Action dated Feb. 18, 2009 in corresponding Great Britain patent application No. 0615364.7.
Search Report from Chinese Patent Office issued on Oct. 5, 2006 for the corresponding Chinese patent application No. GB 0615364.7.
Office Action dated Sep. 5, 2008 in corresponding Chinese patent application No. 200610108437.2 (and English translation).
Examination Report dated Aug. 15, 2008 in corresponding Great Britain patent application No. 0615364.7.

* cited by examiner

*Primary Examiner*—Khoi Tran
*Assistant Examiner*—Ian Jen
(74) *Attorney, Agent, or Firm*—Posz Law Group, PLC

(57) ABSTRACT

A road map management system is provided as follows: drawing a past-direction distribution map (Image A) and a future-direction distribution map (Image B) using multiple vehicles' traveling position data collected via a wide area network during a past-direction data collection period and a future-direction data collection period, respectively; comparing the two distribution maps to extract a differential distribution; defining under a predetermined condition as a recently opened or closed road the differential distribution, which is absent from Image A and present in Image B, or present in Image A and absent from Image B, respectively; and reflecting the defined results on the existing road map data to update.

4 Claims, 10 Drawing Sheets

Image A

Image B

DIF. DISTRIBUTION

DIF. DISTRIBUTION

ROAD MAP MANAGEMENT SYSTEM

CROSS REFERENCE TO RELATED APPLICATIONS

This application is based on and incorporates herein by reference Japanese Patent Application No. 2005-225427 filed on Aug. 3, 2005.

FIELD OF THE INVENTION

The present invention relates to a road map management system, also functioning as a road detection system and road map data update system, to manage road map data by detecting a change in roads when a road is opened, closed, or modified.

BACKGROUND OF THE INVENTION

Road map data may be created using an aerial photograph or on-site survey result, which needs considerable costs and time. If a road management entity does not report a road change such as road opening or road closing, the road map data fails to continue to have a practical use.

Patent document 1 discloses a method for updating road map data using navigation devices mounted in vehicles. The navigation device detects a fact that a vehicle track departs from the road indicated by the road map data and sends the vehicle track to a road map data update system via a wide area communications network. The road map data update system then reflects the received vehicle track on the existing road map data.

Patent document 1: JP-2004-198997 A (USP-7024307)

Road map data used in a navigation device typically defines a road as one or two string lines. Actual roads have a wide range of width from a very narrow road having a lane to allow only one vehicle to run to a very wide road having several lanes in one traffic direction. Therefore, it is very difficult to accurately determine whether a vehicle track departs from an on-map road indicated by road map data. Positioning system using GPS or dead-reckoning navigation has a detection error, which causes the vehicle track to depart from the on-map road. Thus, the method, which uses the vehicle track and the road map data used in the navigation device, might be inaccurate in updating road map data.

SUMMARY OF THE INVENTION

It is an object of the present invention to provide a road map management system to manage road map data by detecting a change in a road when a road is opened, closed, or modified and by reflecting on the existing road map data the detected change in roads to update as needed. This allows accurate detection of a recently opened or closed road without need of comparison of vehicle traveled tracks and road map data used in navigation devices. This also enables the detection to be reflected on the existing road map data to update.

According to an aspect of the present invention, a road map management system is provided as follows. Data collecting means is included for collecting traveling position data, which indicates traveling positions of vehicles having individual terminals, from the terminals. Distribution map generating means is included for generating at least two distribution maps including a first distribution map generated using traveling position data collected during an earlier collection period and a second distribution map generated using traveling position data collected during a later collection period, which has no overlap period with the earlier collection period.

Difference map generating means is included for generating a difference map indicating a difference between the first distribution map and the second distribution map. Road change defining means is included for (i) detecting a differential distribution appearing in the difference map and determined to be present in one of the first distribution map and the second distribution map and absent from another of the first distribution map and the second distribution map, and (ii) defining the detected differential distribution as a road that underwent a change, when the detected differential distribution satisfies a predetermined condition.

Further, as another aspect of the present invention, the above road map management system is further provided with updating means for updating road map data by reflecting the road that underwent the change on the road map data.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

As an example of an embodiment according to the present invention, a road map management system will be explained with drawings. The road map management system may function as a road detection system and a road map data update system. Traveling position data has errors or encounters noises, evenly in any data collection period. It is assumed that computing difference between data collection periods enables errors to cancel each other.

Figure 1:
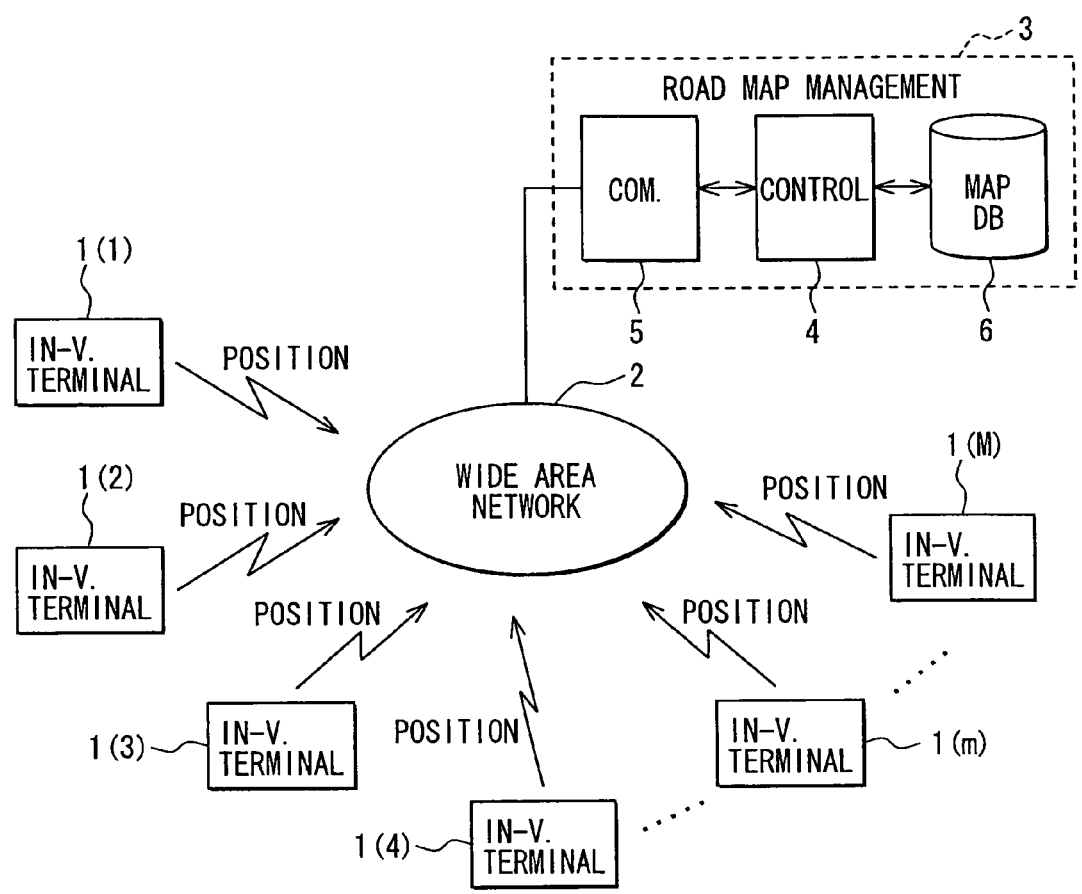
FIG. 1 is a block diagram of an overall configuration of an example according to an embodiment of the present invention.

A road map management system 3 and its peripherals are shown in FIG. 1. Each of multiple in-vehicle terminals 1(*m*) (m=1 to M) is mounted in an individual subject vehicle, and has a floating car data collection (FCD) function. For instance, each terminal 1(*m*) transmits traveling position data via a wide area network 2 to the road map management system 3 each time the corresponding subject vehicle travels a predetermined travel distance or each time a predetermined time period elapses. The traveling position data represents a traveling position of a subject vehicle.

Each terminal 1(m) transmits travel position data, which has not been subjected to a map matching process. Further, vehicle travel state data such as vehicle speed data can be also transmitted as probe data along with the travel position data from the subject vehicle. The number M of the subject vehicles may be specified (or registered) or not specified by the system 3.

The system 3 includes a control unit 4, a communicator 5, and a road map database (DB) 6. The control unit 4 controls an overall operation of the system 3 and functions as means, e.g., for generating a distribution map, generating a difference map, defining a road that undergoes a change, or updating road map data. The communicator 5 receives traveling position data via the network 2 from the terminals 1(m) (m=1 to M) and may function as means, e.g., for collecting traveling position data. The database 6 stores road map data. The control unit 4 reads out road map data from the database 6 and updates the existing road map data by overwriting new road map data.

Figure 2:
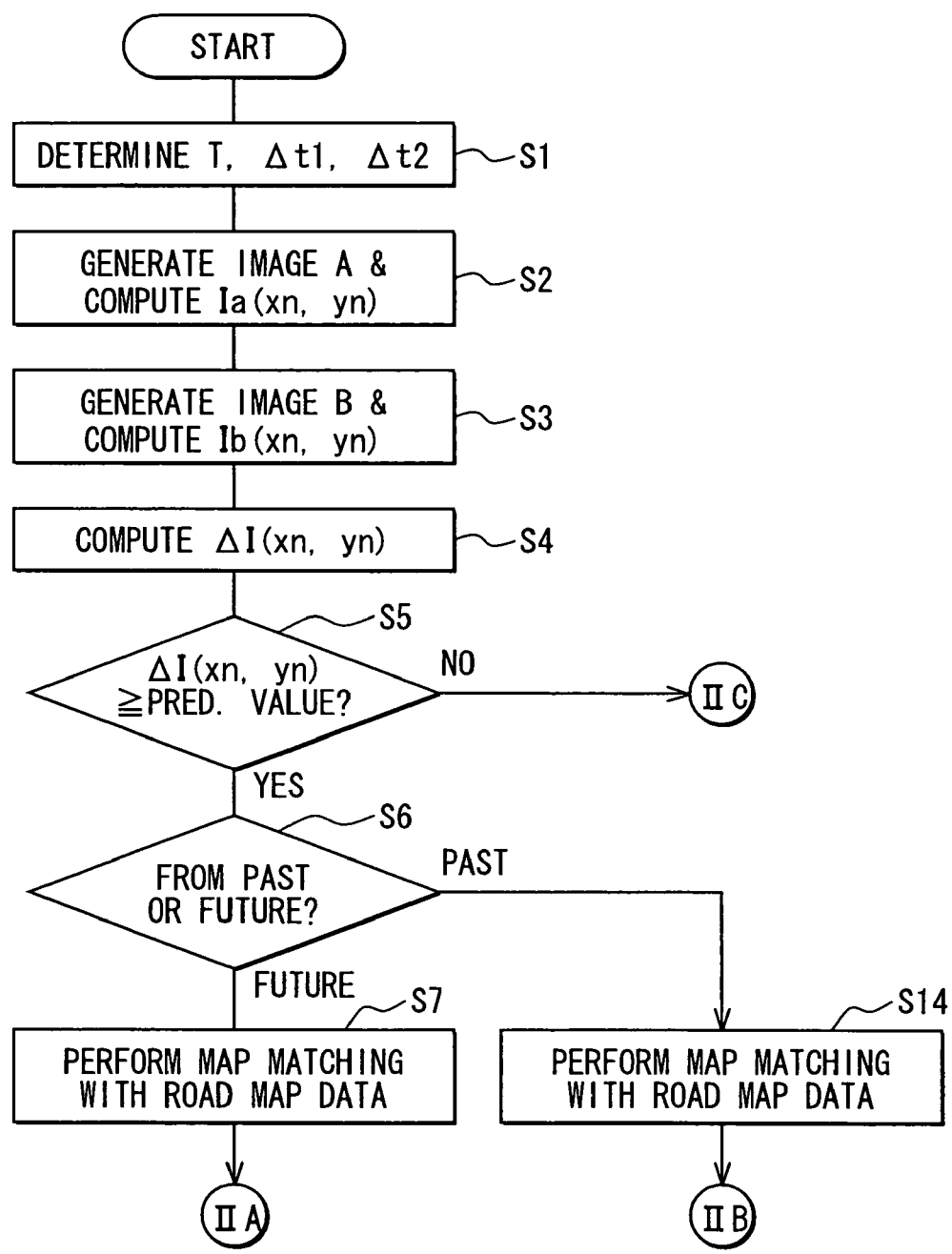
FIGS. 2, 3 are flowchart diagrams.
Figure 3:
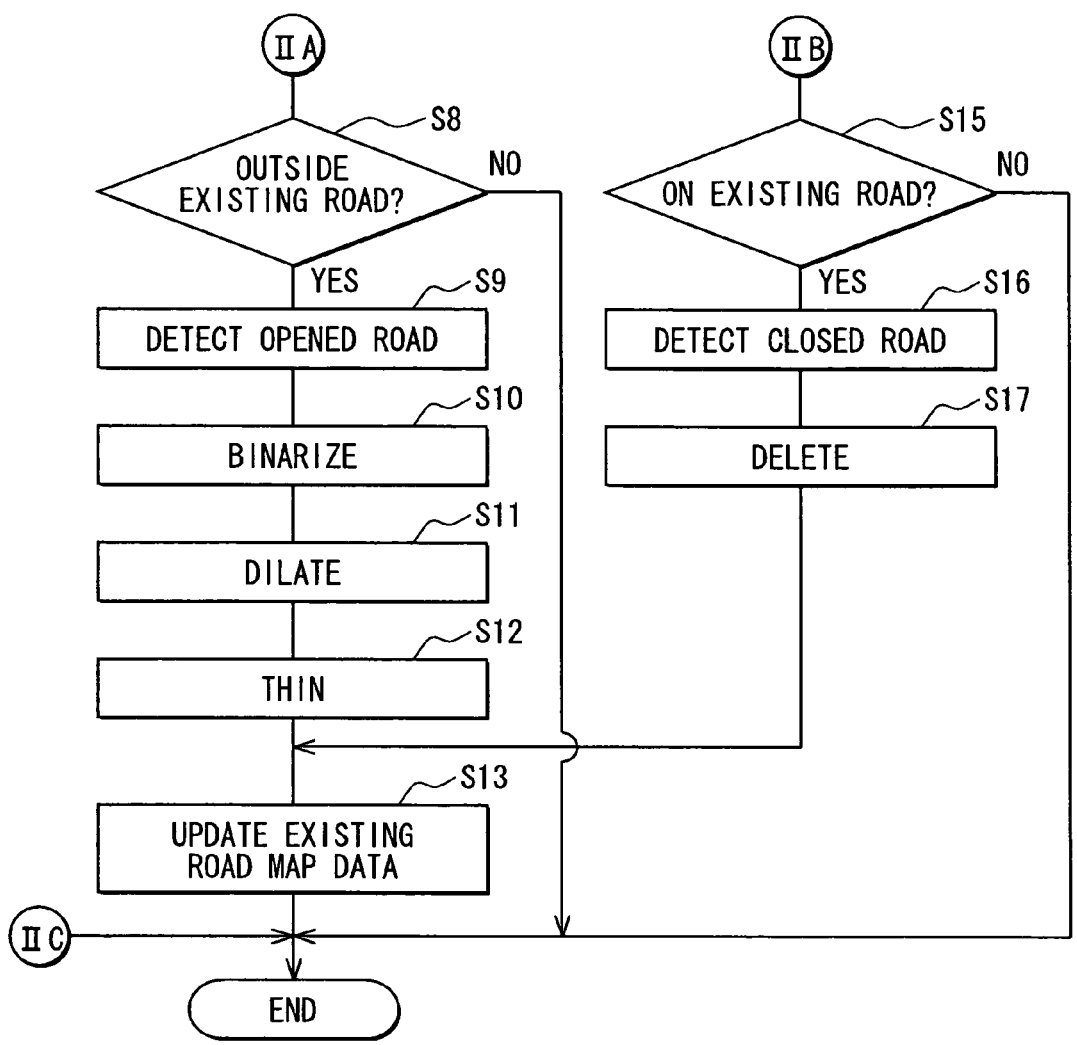
Figure 4:
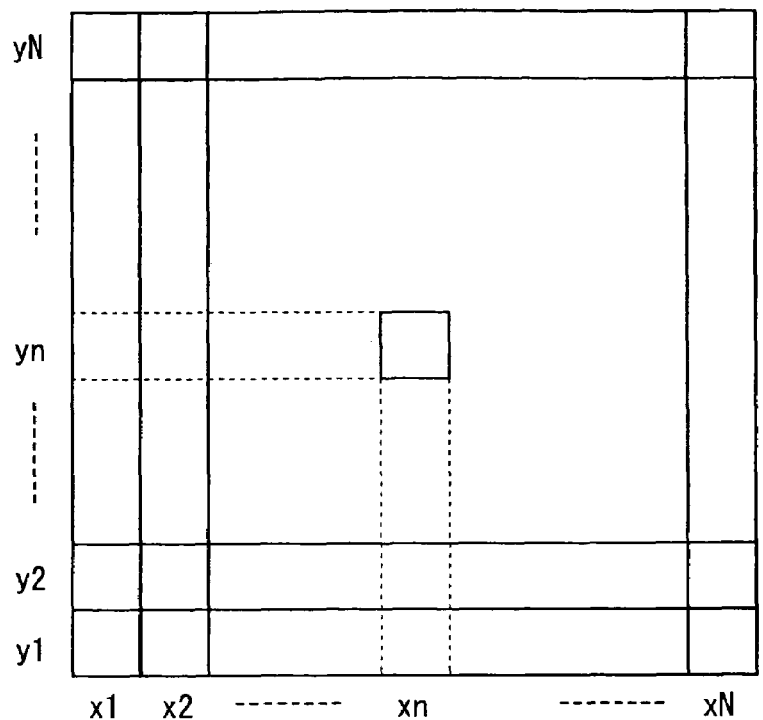
FIG. 4 is a diagram illustrating a road map area.

Next, an operation of the system 3 will be explained below with reference to flowcharts in FIGS. 2, 3 and other drawings. It is assumed that a road map area as a detection target corresponds to a single area represented by a unit area (xn, yn), which is one of multiple two-dimensional meshes (N×N), as shown in FIG. 4.

Figure 5:
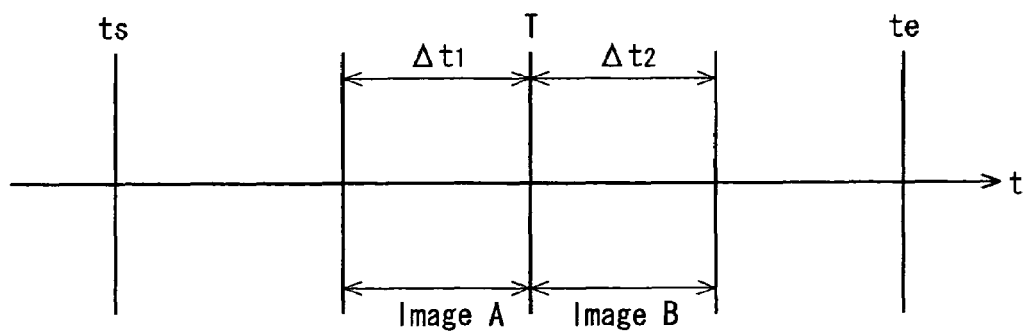
FIG. 5 is a diagram illustrating a data collection period.

In the road map management system 3, the control unit 4 determines a branch point (T), a past-direction data collection period Δt1 (or earlier collection period), and a future-direction data collection period Δt2 (or later collection period) (Step S1). The branch point (T) is a boundary point or time-frame between the earlier and later collection periods, as shown in FIG. 5. This determination by the control unit 4 is comprehensively made based on the number of samples of traveling position data transmitted from the subject vehicles, the size of a unit area as a detection target, a density of roads, a past record, and a system capability. In FIG. 5, "ts" is a start time point of data collection; "te" is an end time point of data collection.

The control unit 4 generates a past-direction distribution map (or earlier distribution map) (Image A) and integrated values (Ia(xn, yn)) using the traveling position data transmitted from the subject vehicles during the earlier collection period Δt1 (Step S2). Here, $$Ia(xn, yn) = \sum_{t=T-\Delta t1}^{T} (\text{Image data}(xn, yn)).$$

The control unit 4 generates a future-direction distribution map (or later distribution map) (Image B) and integrated values (Ib(xn, yn)) using the traveling position data transmitted from the subject vehicles during the later collection period Δt2 (Step S3). Here, $$Ib(xn, yn) = \sum_{t=T}^{T+\Delta t2} (\text{Image data}(xn, yn)).$$

The control unit 4 compares Image A and Image B to extract a difference with respect to each unit area. The control unit 4 then generates a difference map indicating the extracted differences in unit areas, and computes integrated difference values (ΔI(xn, yn)) (Step S4). Here, $$\Delta I(xn,yn) = |Ia(xn,yn) - Ib(xn,yn)|.$$

The control unit 4 determines whether there is a difference in which the computed integrated difference value (ΔI(xn, yn)) is greater than or equal to a predetermined value (Step S5).

Figure 6A:
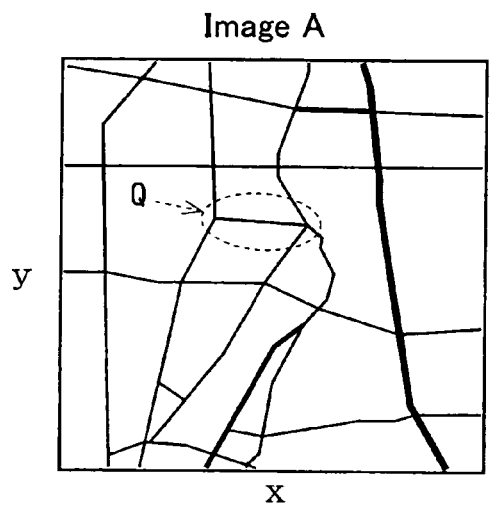
FIG. 6A is a diagram illustrating a map based on a past-direction collection period.
Figure 6B:
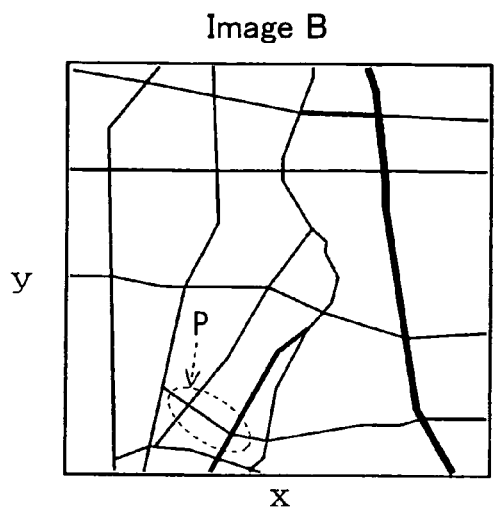
FIG. 6B is a diagram illustrating a map based on a future-direction collection period.
Figure 6C:
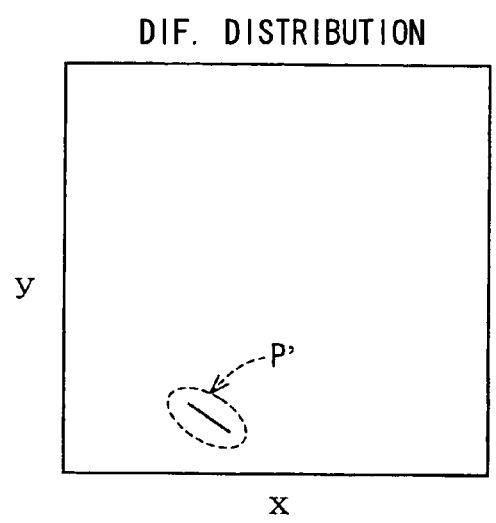
FIG. 6C is a diagram illustrating a difference map based on FIGS. 6A, 6B.
Figure 6D:
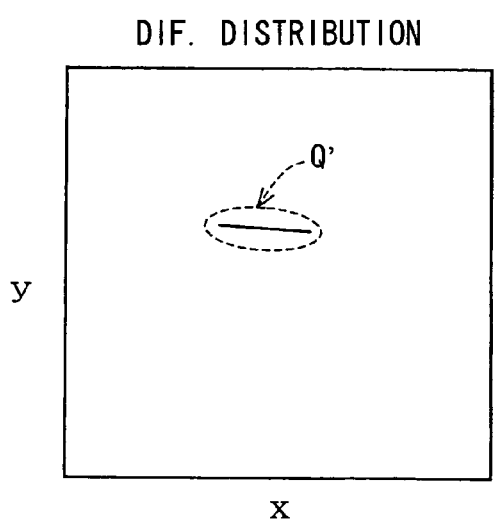
FIG. 6D is a diagram illustrating another difference map based on FIGS. 6A, 6B.

For instance, Image A and Image B are generated, as shown in FIGS. 6A, 6B, respectively. Differences maps A, B are generated based on Images A, B, as shown in FIGS. 6C, 6D, respectively. In these drawings, lines are drawn as an aggregate of points resulting from plotting traveling position data transmitted from the subject vehicles.

For instance, there are differences (hereinafter, a series of differences in a map is referred to as a differential distribution) present in Image B but absent from Image A, which are shown as P in FIG. 6B and P' in FIG. 6C. When integrated difference values of the differential distribution P' are greater than or equal to the predetermined value, the control unit 4 detects presence of the differential distribution P' (Step S5: YES).

In contrast, there is a differential distribution present in Image A but absent from Image B, which is shown as Q in FIG. 6A and Q' in FIG. 6D. When integrated difference values of the differential distribution Q' are greater than or equal to the predetermined value, the control unit 4 detects the differential distribution Q' (or the presence of the differential distribution Q') (Step S5: YES). Then the control unit 4 determines which of Image A or Image B the detected differential distribution results from (Step S6).

The differential distribution P' is determined to result from Image B (i.e., the differential distribution is present in Image B but absent from Image A. The control unit 4 reads out road map data corresponding to the differential distribution P' from the road map database 6 and performs map matching process with respect to the differential distribution P' (Step S7).

Next, the control unit 4 determines whether the differential distribution P' is outside of the existing roads, e.g., on a water area such as a river or sea (Step S8). When the differential distribution P' is determined to be outside of the existing roads (Step S8: YES), the differential distribution P' probably corresponds to a recently opened new road, e.g., bridge. Thus the control unit 4 detects the differential distribution P' as a recently opened road (Step S9). The control unit 4 then performs a binarization process (Step S10), a dilation process (Step S11), and a thinning process (Step S12).

The control unit 4 then reflects or overwrites the differential distribution P' detected as a recently opened road on the existing road map data to update (Step S13) and terminates the operation. When the differential distribution P' is determined to be not outside of the existing roads (Step S8: NO), the control unit 4 deletes the differential distribution P' without detecting it as a recently opened road, and terminates the operation.

Figure 7A:
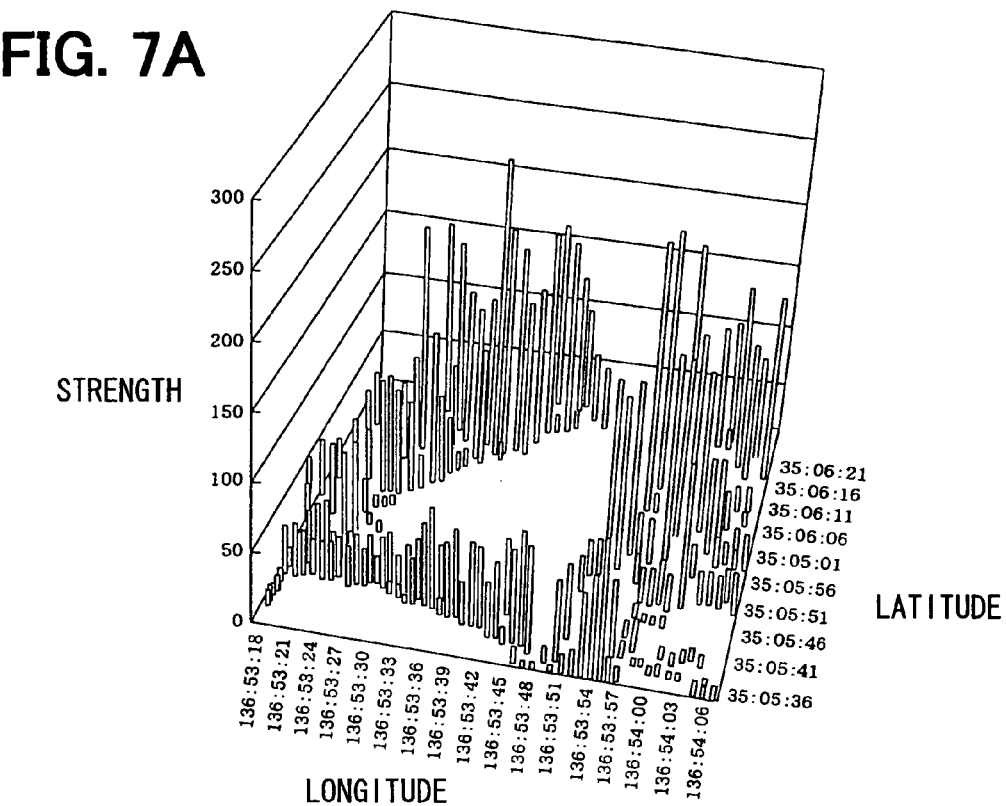
FIG. 7A is a diagram illustrating approximate integrated values of traveling position data in a past-direction data collection period.
Figure 7B:
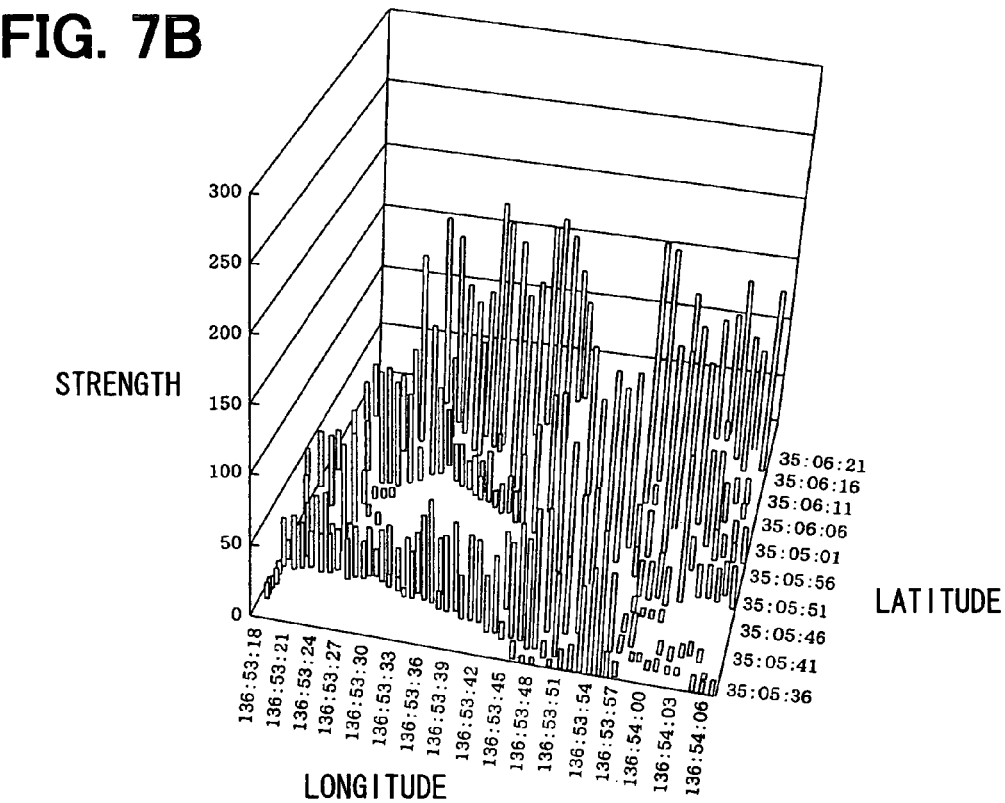
FIG. 7B is a diagram illustrating approximate integrated values of traveling position data in a future-direction data collection period.
Figure 8:
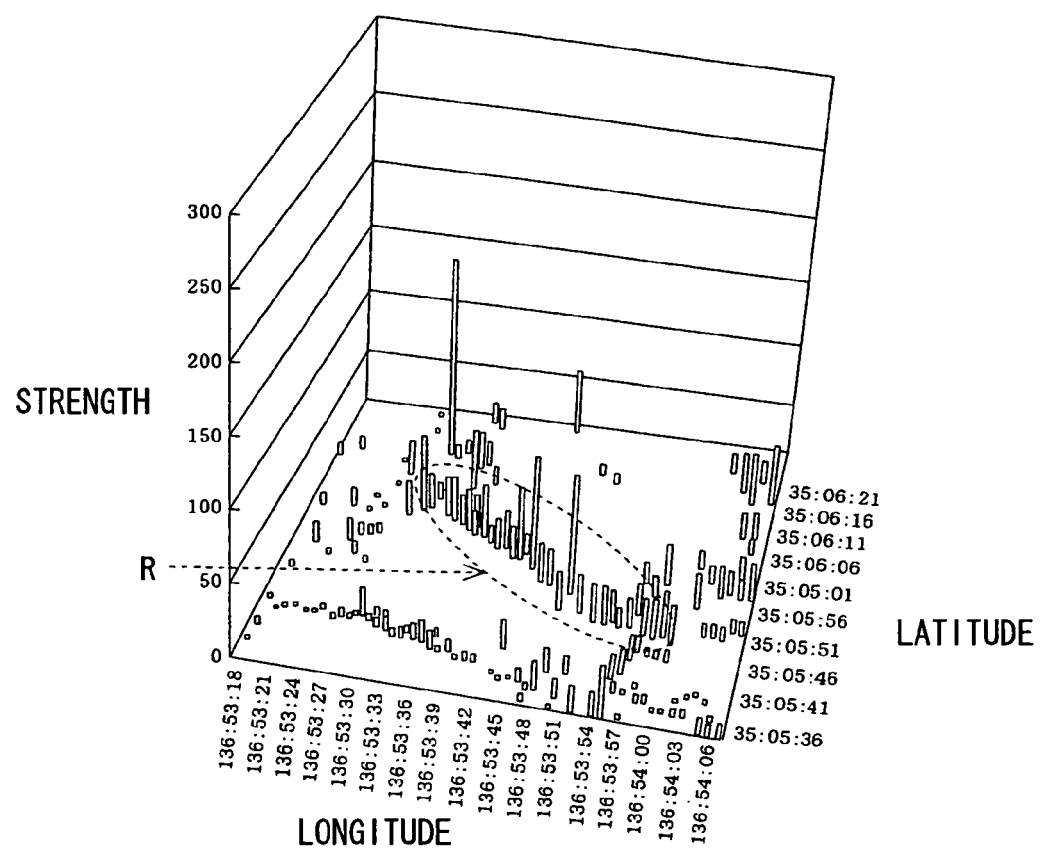
FIG. 8 is a diagram illustrating approximate integrated difference values.

For instance, FIG. 7A illustrates an example of integrated values of units areas in the earlier collection period (Ia(xn, yn), while FIG. 7B illustrates an example of integrated values of units areas in the later collection period (Ib(xn, yn). FIG. 8 illustrates an example of integrated difference values (ΔI(xn, yn)) subtracting the integrated values of the earlier collection period from those of the later collection period. The control unit 4 detects a differential distribution R as a recently opened road.

Thus the differential distribution of the traveling position data in the difference map resulting from Image B (i.e., the later distribution map) is subjected to the map matching process. When the differential distribution is outside of the existing roads, the control unit 4 detects the differential distribution as a recently opened road.

In contrast, the differential distribution Q' in FIG. 6D is determined to result from Image A (i.e., the differential distribution is present in Image A but absent from Image B. The control unit 4 reads out road map data corresponding to the differential distribution Q' from the road map database 6 and performs a map matching process with respect to the differential distribution Q'(Step S14).

Next, the control unit 4 determines whether the differential distribution Q' is on the existing roads (Step S15). When the differential distribution Q' is determined to be on the existing roads (Step S15: YES), the differential distribution Q' probably corresponds to a recently closed road. Thus the control unit 4 detects the differential distribution Q' as a recently closed road (Step 16) and performs a deletion process (Step S17).

The control unit 4 then reflects or overwrites the differential distribution Q' detected as a recently closed road on the existing road map data to update (Step S13) and terminates the operation. When the differential distribution Q' is determined to be not on the existing roads (Step S15: NO), the control unit 4 deletes the differential distribution Q' without detecting it as a recently closed road, and terminates the operation.

Thus the differential distribution of the traveling position data in the difference map resulting from Image A (i.e., the earlier distribution map) is subjected to the map matching process. When the differential distribution is on the existing roads, the control unit 4 detects the differential distribution as a recently closed road.

In addition to detecting a recently opened or closed road, the control unit 4 can detect a road, the shape of which is changed, using the above principle. Furthermore, the control unit 4 can detect when a new road is opened (road opening time point) or when the existing road is closed (road closing time point), by changing setting of the branch point (T), the earlier collection period, and the later collection period in a time axis.

Figure 9:
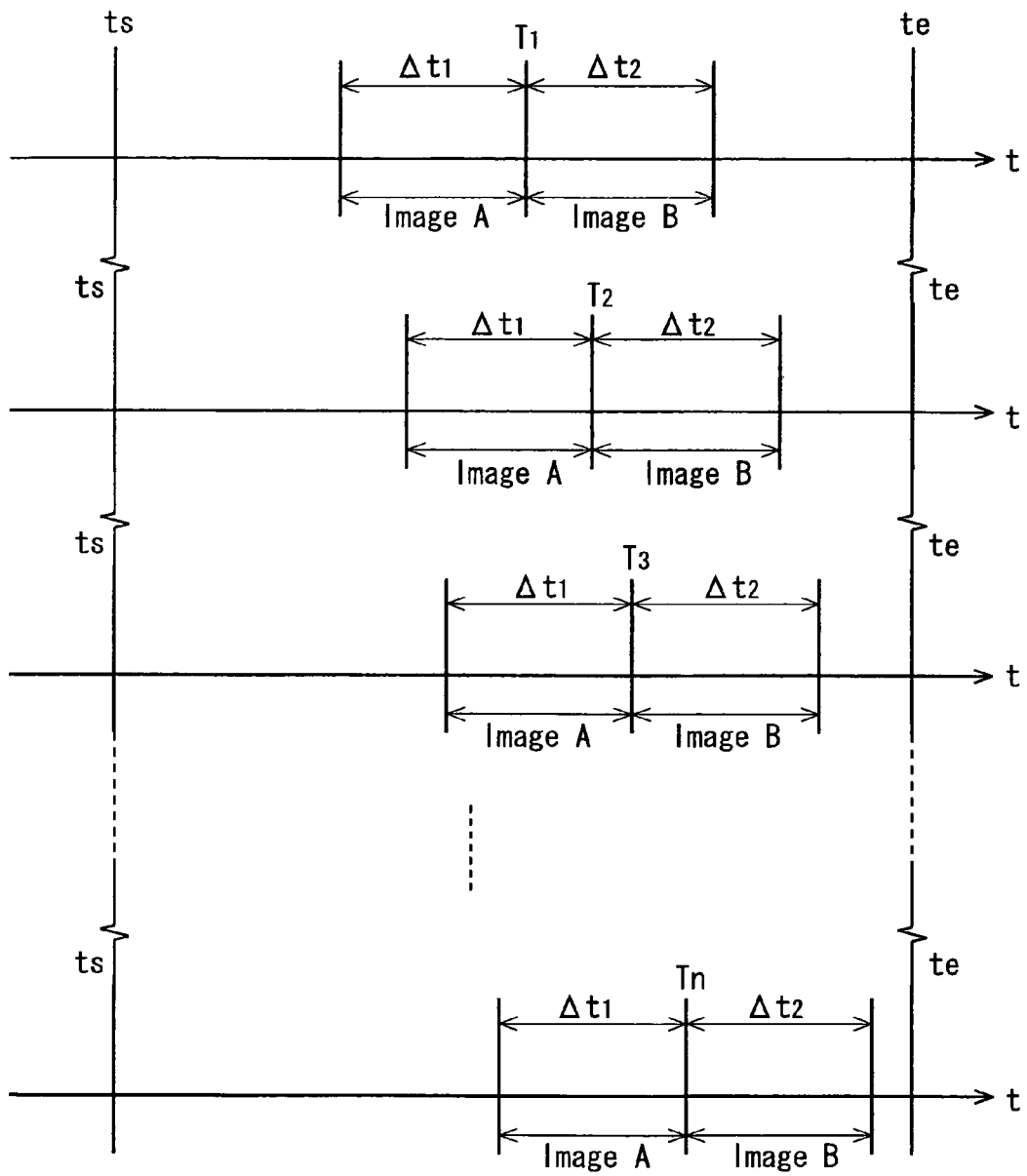
FIG. 9 is a diagram illustrating data collection periods.
Figure 10A:
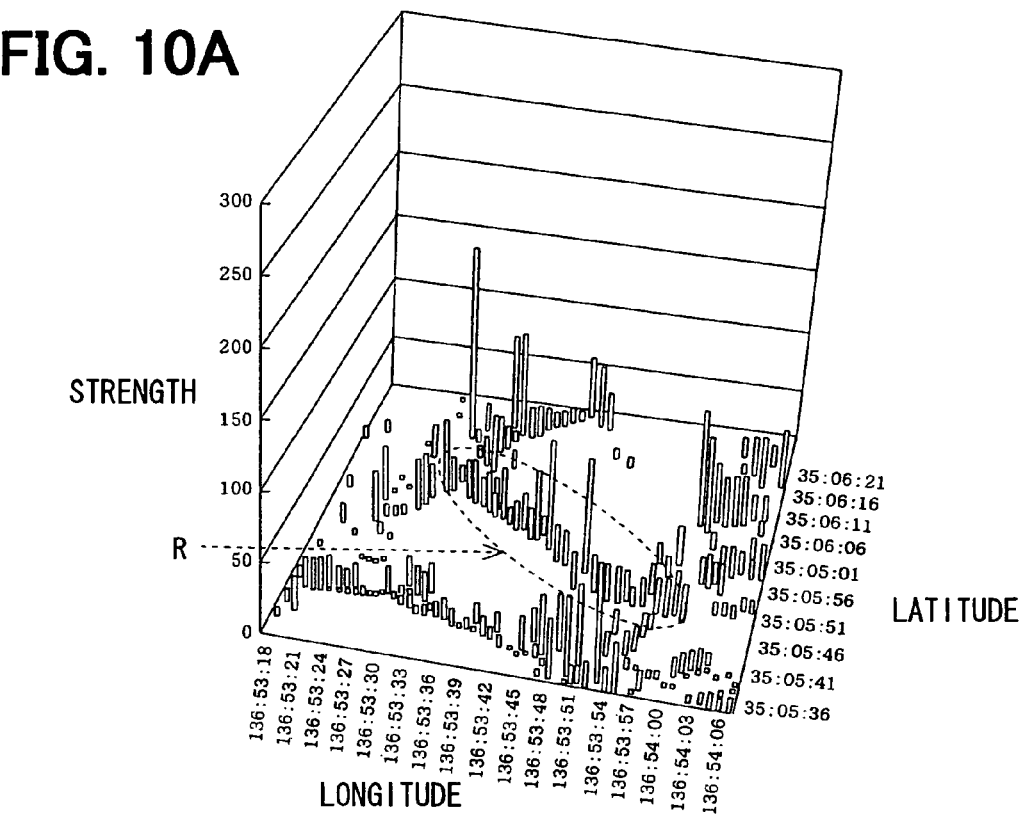
FIGS. 10A, 10B are diagrams illustrating approximate integrated difference values.
Figure 10B:
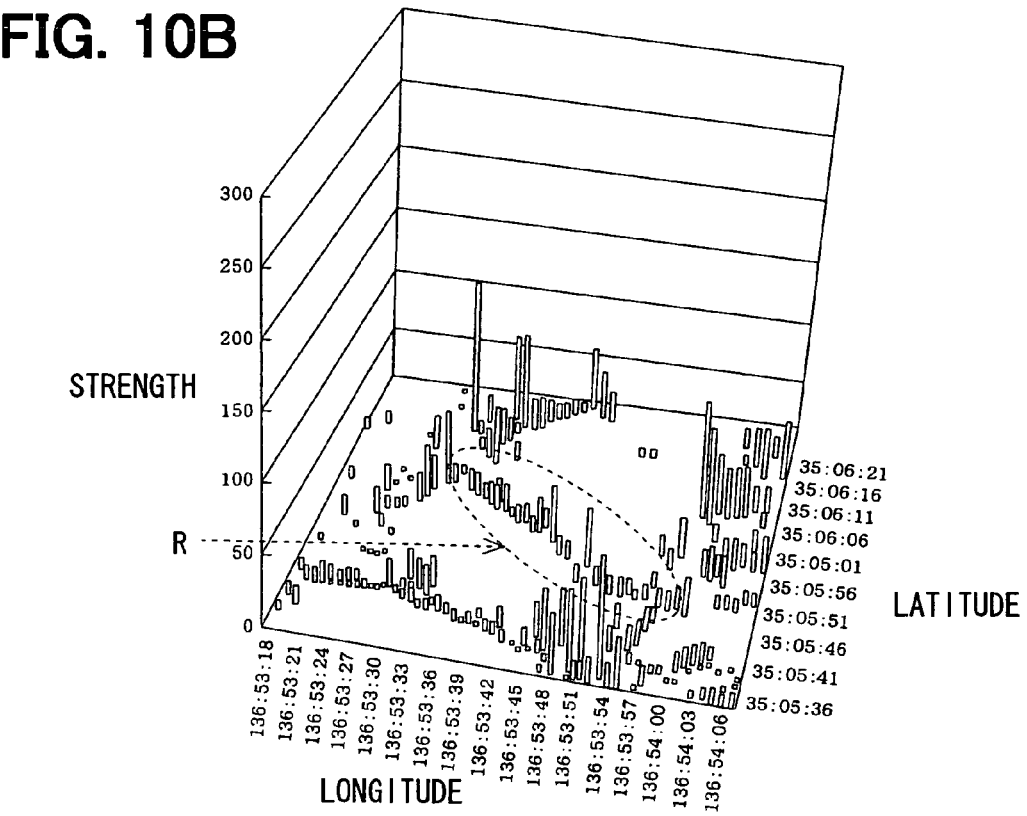

For instance, when the branch point T1 to Tn is moved with the earlier and later collection periods kept in the same periods Δt1 and Δt2 as shown in FIG. 9, a traveling data sample count (or strength of integrated difference values (ΔI(xn, yn)) in a corresponding difference map varies. The road opening or closing time point can be detected as the branch point, which enables the sample count to reach the maximum.

As explained above, the road map management system 3 is provided as follows: comparing a past-direction distribution map (Image A) and a future-direction distribution map (Image B) to extract a differential distribution; detecting as a recently opened or closed road the differential distribution, which is absent from Image A and present in Image B, or present in Image A and absent from Image B with a predetermined condition, respectively; and reflecting the detected results on the existing road map data to update. Thus this allows accurate detection of a recently opened or closed road (e.g., including detection of an actual road width) without need of comparison of vehicle traveled tracks and road map data used in navigation devices, reflecting the detection on the existing road map data to update.

Furthermore, traveling position data without having been subjected to the map matching process are collected from in-vehicle terminals 1(m) (m=1 to M) in subject vehicles, and a distribution map of the traveling position data is generated. This enables accurate detection of actually traveled tracks and accurate update of the existing road map data.

The differential distribution of traveling position data resulting from the future-direction distribution map is detected as a recently opened road only when the differential distribution is determined to be outside of the existing roads as a result of map matching process. This enables accurate detection of a recently opened road and enhances detection accuracy.

The differential distribution of traveling position data resulting from the past-direction distribution map is detected as a recently closed road only when the differential distribution is determined to be on the existing roads as a result of map matching process. This enables accurate detection of a recently closed road and enhances detection accuracy.

(Modifications)

Traveling position data is collected via the wide area network 2; however, traveling position data may be once stored in a storage medium in each in-vehicle terminal 1(m) or each subject vehicle and then be read out from the storage medium.

Each in-vehicle terminal 1(m) may be dedicated for collecting of probe data such as traveling position data, or be a navigation device including the function of collecting the probe data.

Figure 11:
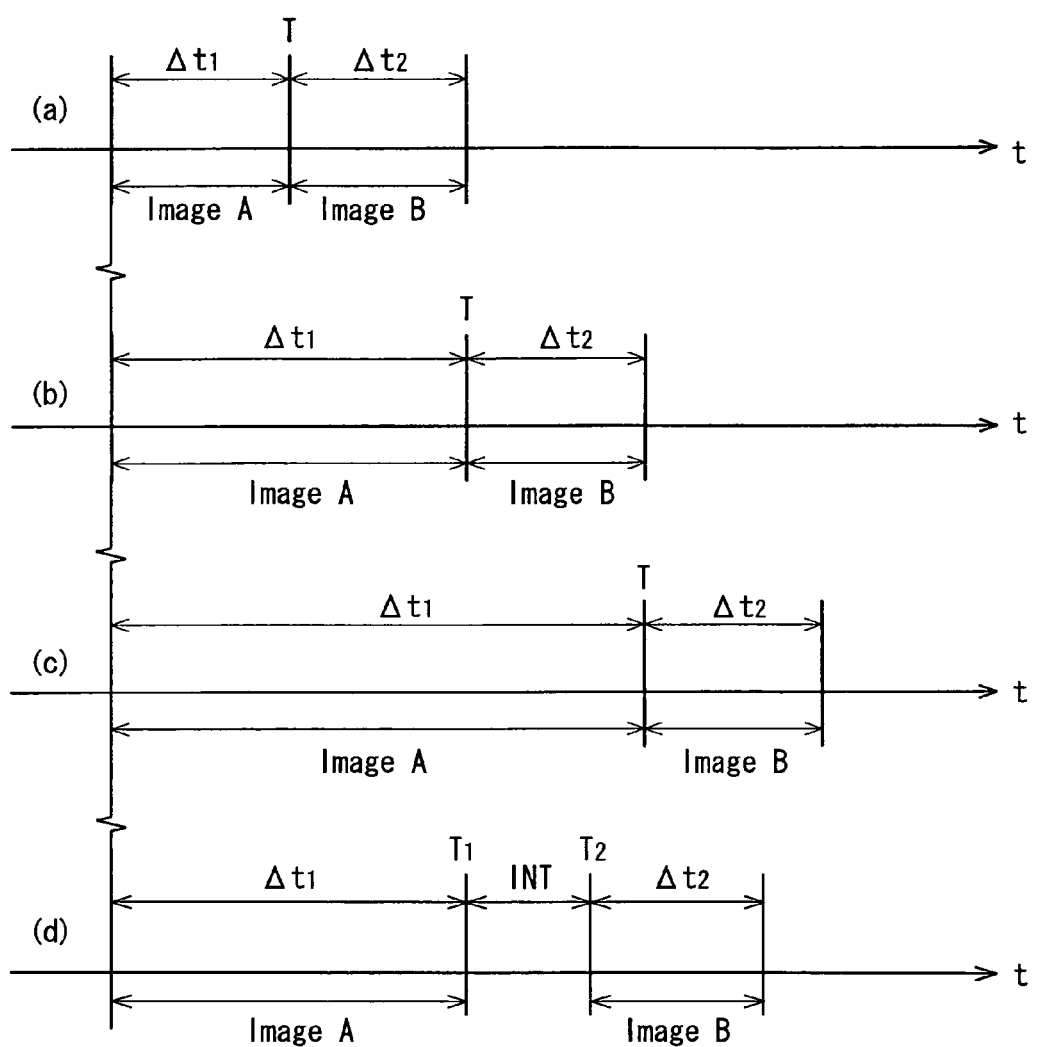
FIG. 11 is a diagram illustrating data collection periods.

An earlier collection period (Δt1) and a later collection period (Δt2) have an identical time period, i.e., Δt=Δt2, and a branch point (T) is set with no time interval between the earlier and later collection periods; however, two collection periods may have mutually different time periods, or two collection periods may have a time interval as a timeframe (INT from T1 to T2) between them, as shown in FIG. 11.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A road map management system comprising:
   data collecting means for collecting traveling position data, which indicates traveling positions of a plurality of vehicles having individual terminals, from the terminals;
   distribution map generating means for generating at least two distribution maps including a first distribution map generated as an aggregate of points based on traveling position data relative to the plurality of vehicles collected by the data collecting means during an earlier collection period and a second distribution map generated as an aggregate of points based on traveling position data relative to the plurality of vehicles collected by the data collecting means during a later collection period, which has no overlap period with the earlier collection period;

difference map generating means for generating a difference map indicating a difference between the first distribution map and the second distribution map; and road change defining means for detecting a differential distribution appearing in the difference map and determined to be present in one of the first distribution map and the second distribution map and absent from another of the first distribution map and the second distribution map, and defining the detected differential distribution as a road that underwent a change, when the detected differential distribution satisfies a predetermined condition, wherein the road change defining means defines, as a recently opened road, a differential distribution, which is absent from the first distribution map and present in the second distribution map and is determined to be outside of a road included in road map data after undergoing a map matching process.

2. A road map management system comprising:

data collecting means for collecting traveling position data, which indicates traveling positions of a plurality of vehicles having individual terminals, from the terminals;

distribution map generating means for generating at least two distribution maps including a first distribution map generated as an aggregate of points based on traveling position data relative to the plurality of vehicles collected by the data collecting means during an earlier collection period and a second distribution map generated as an aggregate of points based on traveling position data relative to the plurality of vehicles collected by the data collecting means during a later collection period, which has no overlap period with the earlier collection period;

difference map generating means for generating a difference map indicating a difference between the first distribution map and the second distribution map; and road change defining means for detecting a differential distribution appearing in the difference map and determined to be present in one of the first distribution map and the second distribution map and absent from another of the first distribution map and the second distribution map, and defining the detected differential distribution as a road that underwent a change, when the detected differential distribution satisfies a predetermined condition, wherein the road change defining means defines, as a recently closed road, a differential distribution, which is present in the first distribution map and absent from the second distribution map and is determined to be on a road included in road map data after undergoing a map matching process.

3. A road map management system comprising:

data collecting means for collecting traveling position data, which indicates traveling positions of a plurality of vehicles having individual terminals, from the terminals;

distribution map generating means for generating at least two distribution maps including a first distribution map generated as an aggregate of points based on traveling position data relative to the plurality of vehicles collected by the data collecting means during an earlier collection period and a second distribution map generated as an aggregate of points based on traveling position data relative to the plurality of vehicles collected by the data collecting means during a later collection period, which has no overlap period with the earlier collection period;

difference map generating means for generating a difference map indicating a difference between the first distribution map and the second distribution map; and road change defining means for detecting a differential distribution appearing in the difference map and determined to be present in one of the first distribution map and the second distribution map and absent from another of the first distribution map and the second distribution map, and defining the detected differential distribution as a road that underwent a change, when the detected differential distribution satisfies a predetermined condition, wherein the first distribution map is generated in accordance with $$Ia(xn, yn) = \sum_{t=T-\Delta t1}^{T} (\text{Image data}(xn, yn));$$

where Ia(xn, yn)=the actual traveling position data at points (xn, yn),

T=a branch point in time which is between the earlier collection period and the later collection period, the second distribution map is generated in accordance with $$Ib(xn, yn) = \sum_{t=T}^{T+\Delta t2} (\text{Image data}(xn, yn));$$

and the difference map is generated in accordance with $\Delta I(xn,yn)=|Ia(xn,yn)-Ib(xn,yn)|$.

4. A road map management system comprising:

a data collection unit that collects traveling position data, which indicates actual traveling positions of different vehicles having individual terminals, from the terminals;

a distribution map generation unit that generates, responsive to the actual traveling positions from different vehicles collected by the data collection unit, at least two distribution maps including a first distribution map generated using actual traveling position data collected by the data collection unit during an earlier collection period and a second distribution map generated using actual traveling position data collected by the data collection unit during a later collection period, which has no overlap period with the earlier collection period;

a difference map generation unit, responsive to the first and second distribution maps, that generates a difference map indicating a difference in the actual traveling positions between the first distribution map and the second distribution map; and a road change definition unit that
    detects a differential distribution appearing in the difference map and determined to be present in one of the first distribution map and the second distribution map and absent from another of the first distribution map and the second distribution map, and
    defines the detected differential distribution as a road that underwent a change, when the detected differential distribution satisfies a predetermined condition,
the first and second distribution maps reflecting a distribution of aggregated actual traveling positions of different vehicles, wherein the first distribution map is generated in accordance with $$Ia(xn, yn) = \sum_{t=T-\Delta t1}^{T} (\text{Image data}(xn, yn));$$

where Ia(xn, yn)=the actual traveling position data at points (xn, yn),
T=a branch point in time which is between the earlier collection period and the later collection period,
the second distribution map is generated in accordance with $$Ib(xn, yn) = \sum_{t=T}^{T+\Delta t2} (\text{Image data}(xn, yn));$$

and
    the difference map is generated in accordance with
    $\Delta I(xn,yn)=|Ia(xn,yn)-Ib(xn,yn)|$.

* * * * *